(12) United States Patent
Schäffner et al.

(10) Patent No.: US 8,945,475 B2
(45) Date of Patent: Feb. 3, 2015

(54) EXHAUST-GAS AFTERTREATMENT SYSTEM

(75) Inventors: Guido Schäffner, Horgenzell (DE); Hans Sudmanns, Friedrichshafen (DE); Claudia Riedel, Friedrichshafen (DE)

(73) Assignee: MTU Friedrichshafen GmbH, Friedrichshaften (DE)

( * ) Notice: Subject to any disclaimer, the term of this patent is extended or adjusted under 35 U.S.C. 154(b) by 275 days.

(21) Appl. No.: 13/698,533

(22) PCT Filed: May 9, 2011

(86) PCT No.: PCT/EP2011/002286
§ 371 (c)(1),
(2), (4) Date: Jan. 8, 2013

(87) PCT Pub. No.: WO2011/144303
PCT Pub. Date: Nov. 24, 2011

(65) Prior Publication Data
US 2013/0209319 A1    Aug. 15, 2013

(30) Foreign Application Priority Data
May 17, 2010   (DE) .......................... 10 2010 020 728

(51) Int. Cl.
*B01D 50/00* (2006.01)
(52) U.S. Cl.
USPC ......................................... 422/169; 422/177
(58) Field of Classification Search
USPC ............ 422/168, 169, 172, 177; 60/272, 299; 55/523
See application file for complete search history.

(56) References Cited

U.S. PATENT DOCUMENTS

| 5,578,277 A | 11/1996 | White et al. |
| 7,918,914 B2 | 4/2011 | Sudmanns et al. |
| 2006/0153748 A1* | 7/2006 | Huthwohl et al. ............ 422/172 |

FOREIGN PATENT DOCUMENTS

| DE | 102004013786 A1 | 10/2005 |
| DE | 102004043931 A1 | 3/2006 |
| DE | 202006012530 U1 | 11/2006 |
| EP | 1258606 A2 | 11/2002 |
| EP | 1644621 B1 | 8/2009 |
| WO | WO-2004113690 A1 | 12/2004 |
| WO | WO 2004113697 A1 * | 12/2004 |

OTHER PUBLICATIONS

PCT International Search Report for PCT/EP2011/002286 dated Aug. 29, 2011.

* cited by examiner

*Primary Examiner* — Tom Duong
(74) *Attorney, Agent, or Firm* — Rader, Fishman & Grauer PLLC

(57) ABSTRACT

An exhaust post-treatment device is designed in a layered fashion and comprises an exhaust cleaning arrangement lying between a supply chamber and a transition chamber with soot filters lying at both sides of a denitrification-catalytic converter unit, with the transition chamber comprising a mixing chamber open towards the denitrification-catalytic converter unit, in which starting at the soot filters via separate guide channels, the exhaust is injected in the opposite direction of flow and which mixing chamber is limited by guide panels, which form walls of the guide channels extending encompassing along the housing towards the mixing chamber.

10 Claims, 7 Drawing Sheets

EXHAUST-GAS AFTERTREATMENT SYSTEM

CROSS REFERENCE TO RELATED APPLICATIONS

This application is a National Phase Application related to PCT/EP2011/002286 filed on May 9, 2011, which application claims priority to DE 10 2010 020 728.4 filed on May 17, 2010, which applications are incorporated herein by reference in their entirety.

TECHNICAL FIELD

The disclosure relates to an exhaust post-treatment device, particularly for diesel engines.

BACKGROUND

Exhaust post-treatment devices frequently offer additional installations, which must be accommodated in diesel-engine drive systems by way of retrofitting or modification. However, even in new constructions, the additional consideration of a new exhaust post-treatment device frequently leads to considerable difficulties, because in addition to the space required for such devices, generally, it is undesirable to compromise the familiar appearance of the vehicle by incorporating such a device, or to do so only to an irrelevant extent.

In spite of the limitations resulting here, the exhaust post-treatment devices should show a design with regards to their structure, as well as with regards to cost aspects, which allow the necessary modification, at least without interfering with the respective design principle.

An exhaust post-treatment device in which the respective aspects have partially been considered is known from EP 1 644 621 B1. In this exhaust post-treatment device, an exhaust treatment arrangement is provided in a cylindrical housing, which comprises a soot filter unit and a denitrification-catalytic converter unit arranged lying concentrically in reference to each other, which are arranged between upstream and downstream supply connections, on the one side, and an axially opposite transition chamber, on the other side. Exhaust flows in via the upstream supply connection through the annular soot filter unit, encased by the housing, axially to the transition chamber, where it radially mouths out via helical guide channels, flown through in the same direction and off-set with regards to its influx and outlet cross-section by 180°, in outlet cross-sections facing each other allocated thereto. Starting at the transition or mixing chamber, axially the denitrification-catalytic converter unit is approached. Starting at the denitrification-catalytic converter unit, which is surrounded by the annular soot filter unit and which is axially flown through opposite in reference to the soot filter unit, the exhaust transfers to the downstream supply connection. When the denitrification-catalytic converter unit is embodied as a so-called SCR-catalytic converter, according to the explanations of WO 2004/113690 corresponding to the above-mentioned EP 1 644 621 B1, the injection of the urea solution occurs for denitrification purposes in the area of the mixing chamber.

In order to allow adjusting such an exhaust post-treatment device in its design to the requirements modified with regards to capacity, the device is variable with regards to the length of the soot filters and denitrification-catalytic converter units such that the transfer chamber is arranged in a removable end part of the housing and that based on the respective separation level via support devices of different lengths, differently long soot filter and denitrification-catalytic converter units of different lengths can be clamped in the device. This way, by the respective selection in the longitudinal measurement of its units it can be designed adjusted in its construction to the needs to a certain extent.

In another exhaust post-treatment device—DE 102 50 050 A1—with a cylindrical housing and axially opposite inlet and outlet connections the housing is axially chambered and the interior chamber of the housing is divided by intermediate panels into different functional areas. They result such that a soot filter unit is arranged annularly surrounding a central tube, axially passing through intermediate panels, and a nitrogen-catalytic converter unit is arranged axially off-set in reference thereto in an adjacent chamber. Starting on a facial inlet chamber with axially penetrating openings to an adjacent chamber, accepting the soot filter unit, the exhaust flows radially through the filter and radially enters the central tube. Here, at the input side the injection of urea occurs as reduction means, which mixes with the exhaust. At the outlet end the central tube mouths in a mixing chamber, from which the exhaust flows through the nitrogen-catalytic converter unit opposite in reference to the flow through the central tube and exits to a discharge chamber located between the chamber accepting the soot filter unit and the mixing chamber and is branched off the outlet connection.

In another exhaust post-treatment device known from DE 10 2004 043 931 A1 with an essentially cuboid cross-section, the soot filter unit and the reduction means-catalytic converter unit are located layered on top of each other in an opposite direction of flow through the soot filter unit and the reduction means-catalytic converter unit laterally in reference to the direction of flow and taper opposite to the face of the housing allocated to the supply connections to a transmission and mixing chamber, where the dosing of the reduction means also occurs. The soot filter unit is formed by a soot filter showing an approximately rectangular cross-section while the catalytic converter unit is composed of several circular cylindrical catalytic converter modules, which are arranged adjacent to the wall of the soot filter in two levels side-by-side overlapping each other, so that within the cuboid cross-sections of the soot filter a cube wall extends longitudinally and the catalytic converter modules assume the space between the soot filter and the opposite cuboid wall.

SUMMARY

The present disclosure is directed to the creation in its basic structural design of an exhaust post-treatment device as simple as possible, which while upholding the structural technical principles, can be designed in various sizes and particularly can be a design realized in various size categories with equivalent, and preferably identical components, and can be used variably in its function.

This is attained in the features of claim 1, with the additional claims disclosing beneficial and partially independently protected design features, and here particularly in connection with the explanations of the description and in consideration of the illustrations in the drawings.

According to one exemplary arrangement, an exhaust post-treatment device in the area of its exhaust cleaning arrangement, comprises a soot filter unit and a denitrification-catalytic converter unit, a housing cross-section perpendicularly in reference to the direction of flow, which is multihedral, and may be approximately cuboid, and rectangular, within which the soot filter unit and the denitrification-catalytic converter unit are arranged side-by-side, perpendicularly in reference to the direction of flow.

Here, the soot filter unit is divided in its perimeter into two soot filters in reference to such a basic form of the exhaust cleaning arrangement according to the disclosure, thus by two soot filters, each of which arranged along opposite side walls and assuming the respective portion of the structural area extending between lateral walls surrounding at the housing side of the exhaust cleaning device, so that between these soot filters a spatial component remains which can be assumed by the denitrification-catalytic converter unit.

In reference thereto, the soot filters are arranged symmetrically, and in one exemplary arrangement, having the same form and design. This way, large-area, relatively flat perimeters can be realized for the exhaust cleaning device, with appropriately large-area, preferably rectangular soot filter and denitrification-catalytic converter units, whose height, depending on the requirements, can be kept relatively small in the direction of flow and thus both with regards to the soot filtering as well as with regards to the denitrification they show a beneficial basic shape.

According to the disclosure, here an exhaust cleaning device comprises two separately arranged soot filters between which the denitrification catalytic converter is located, namely in an extension perpendicular in reference to the opposite direction of flow of the exhaust flowing through the soot filter and the denitrification-catalytic converters and along the soot filters arranged along opposite housing side walls.

The exhaust cleaning device shows a height, relatively low in reference to the length of its side and lateral walls, so that the exhaust cleaning arrangement is presented in its contour as a flat block, in which the lateral walls extending between the side walls preferably show a length equivalent to a multiple of the length of the side walls, with the height of the side and the lateral walls being shorter than their length, preferably equivalent to a fraction of the length of the side walls.

Advantageously it is possible to compose both the soot filters of the soot filter unit from individual cuboid soot filter elements, adjacent to each other laterally in reference to the direction of flow, and also to structure the denitrification-catalytic converter unit in a modular fashion, comprising respectively separately framed, particularly cylindrical catalytic converter elements.

This way, with an identical basic design of the exhaust cleaning device the condition is created to design this device with regards to the soot filter unit as well as the denitrification-catalytic converter unit with elements respectively identical in their design and function. This can be achieved in a beneficial manner according to the invention by an installation structure arranged at the housing which serves as a support frame for the soot filters as well as the elements of the catalytic converter so that here when necessary any exchange and/or cleaning of the elements is possible, particularly the soot filters.

The cuboid embodiment of the exhaust cleaning device according to the invention also offers good conditions for a modular composition of the exhaust treatment device overall, including its housing, so that it is quasi designed with levels, resulting in a design of the exhaust treatment device comprising the transition chamber as the basement, the exhaust cleaning arrangement as the ground level, and an upper level, with the supply connections being allocated thereto and in which the supply paths between the supply connections and the soot filter and the denitrification-catalytic converter units are formed.

According to the design of the post-treatment device, in a "layered form" the housing may also be sectioned accordingly; the respective housing sections may be connected for example by flanges. Such a solution, also designed with regards to the housing, allows for the spatial requirements to be fulfilled in a plurality of variations even for large dimensions.

An overall beneficial design, suitable for both large as well as small exhaust post-treatment devices, comprises to design the housing encasing the supply connections in the covering area for the denitrification-catalytic converter unit as a supply chamber which, mutually separated, comprises one or more upstream supply connection(s) and a spatial section connected to the downstream supply connection or connections. Based on the spatial section supplied via the upstream supply connections transition connections are provided for the soot filters of the soot filter unit provided laterally in reference to the denitrification-catalytic converter unit, allowing to individually impact it according to the disclosure as desired, with beneficially in the transition connections, particularly in the transition from the upstream spatial section to the transition connections respectively at least one, preferably several oxidation catalytic converters are provided. In exhaust devices comprising two or more channels, in reference to such an embodiment, there is additionally the option to divide the upstream spatial section structurally and this way to maintain a multi-path influx of the exhaust guided divided upstream in the spatial section also in reference to the soot filters.

The realization of these functions is not limited to a segmented design of the housing, but it can also be realized with an exemplary one-part, cap-shaped housing design, and here particularly smaller exhaust post-treatment devices allow perhaps a design of the cap-shaped housing as a folded housing, in which the interior structure is inserted, namely particularly via the bottom area, which can be closed by a separated base plate. The base plate in turn may be connected to the interior and/or installation structure so that overall the design of the housing with an interior structure is shown as a two-part unit.

Starting at the soot filters, the exhaust transfers in the solution according to the disclosure to a transition chamber, in which the exhaust flows, divided upstream in the inlet to the soot filters, recombined and quasi-bundled in a mixing chamber. The mixing chamber is located axially covering the denitrification-catalytic converter unit and thus also, in reference to the denitrification-catalytic converter unit, located therebetween, opposite to the downstream spatial section of the supply chamber.

Within the transition chamber, the partial exhaust flows supplied via the soot filters are fed via guide channels to the mixing chamber, namely in an opposite direction of flow to the mixing chamber so that an intense mixing of the exhaust results prior to entering the denitrification-catalytic converter unit.

This is particularly essential when the denitrification-catalytic converter unit is formed by a SCR-catalytic converter and accordingly a urea solution is added to the exhaust as reduction means.

This occurs by injecting urea into the guide channel, namely particularly into the starting area respectively following the soot filter so that, starting at the location of the injection into the guide channel to the mouthing of the exhaust supplied via the guiding channel to the mixing chamber, relatively long paths can be realized, which allow good mixing of the reduction means with the exhaust and thus a disintegration of the reduction means already in the respective guide channel. Any intensifying of this processing with a respective release of ammonia and a homogenization of the ammonia-exhaust mixture is achieved in the mixing chamber.

Here, the essentially opposite influx of the exhaust charged with reduction means in the mixing chamber considerably contributes to this effect.

The guide channels are formed according to the disclosure in a simple design by guide panels, which starting from their connection to the interior structure of the exhaust post-treatment device extend inclined in reference to the bottom zone of the transition chamber, limiting a channel cross-section, particularly triangular and adjacent to the respective housing wall. The sections of the guide channels engaging under the soot filters and extending along the respectively adjacent side wall of the housing, each transfer to a section respectively extending along the lateral wall of the housing, transfer into a section separated from the mixing chamber via a respective guide panel section, so that the guide channels, starting from the soot filters opposite each other in reference to the denitrification-catalytic converter unit extend angular, in a triangular cross-section and opposite direction of flow, respectively along one of the opposite side walls and one of the opposite lateral walls; the guide panels limiting the guide channels along the lateral wall from the mixing chamber each end near the guide panel of the other guide channel extending along the side wall. The mixture of exhaust and reduction means, flowing via a guide channel along the perimeter of the housing, therefore impacts the area of the other guide channel facing the mixing chamber in the proximity of the guide panel extending along the side wall and is deflected thereby as a part of the boundary walls of the mixing chamber. The guide panels allocated to the guide channels therefore overall form a cup-shaped boundary of the mixing chamber open towards the bottom area of the transition chamber.

The injection of the reduction means, in reference to the exemplary embodiment here the urea solution, preferably occurs in the respective collection area of a guide channel located covering the soot filter; the injection can be performed preferably also in a spray fashion without pressurized air.

It is included within the scope of the disclosure to provide a so-called slip-catalytic converter, respectively at the outlet end of the SCR-catalytic converters covering the supply chamber at the outlet side, in order to avoid any escaping of urea solution and/or ammonia with the outflowing exhaust in disadvantageous operating conditions.

BRIEF DESCRIPTION OF THE DRAWINGS

Additional details and features of the disclosure are discernible from the claims, the following description, and the drawings. It shows:

DETAILED DESCRIPTION

Figure 1:
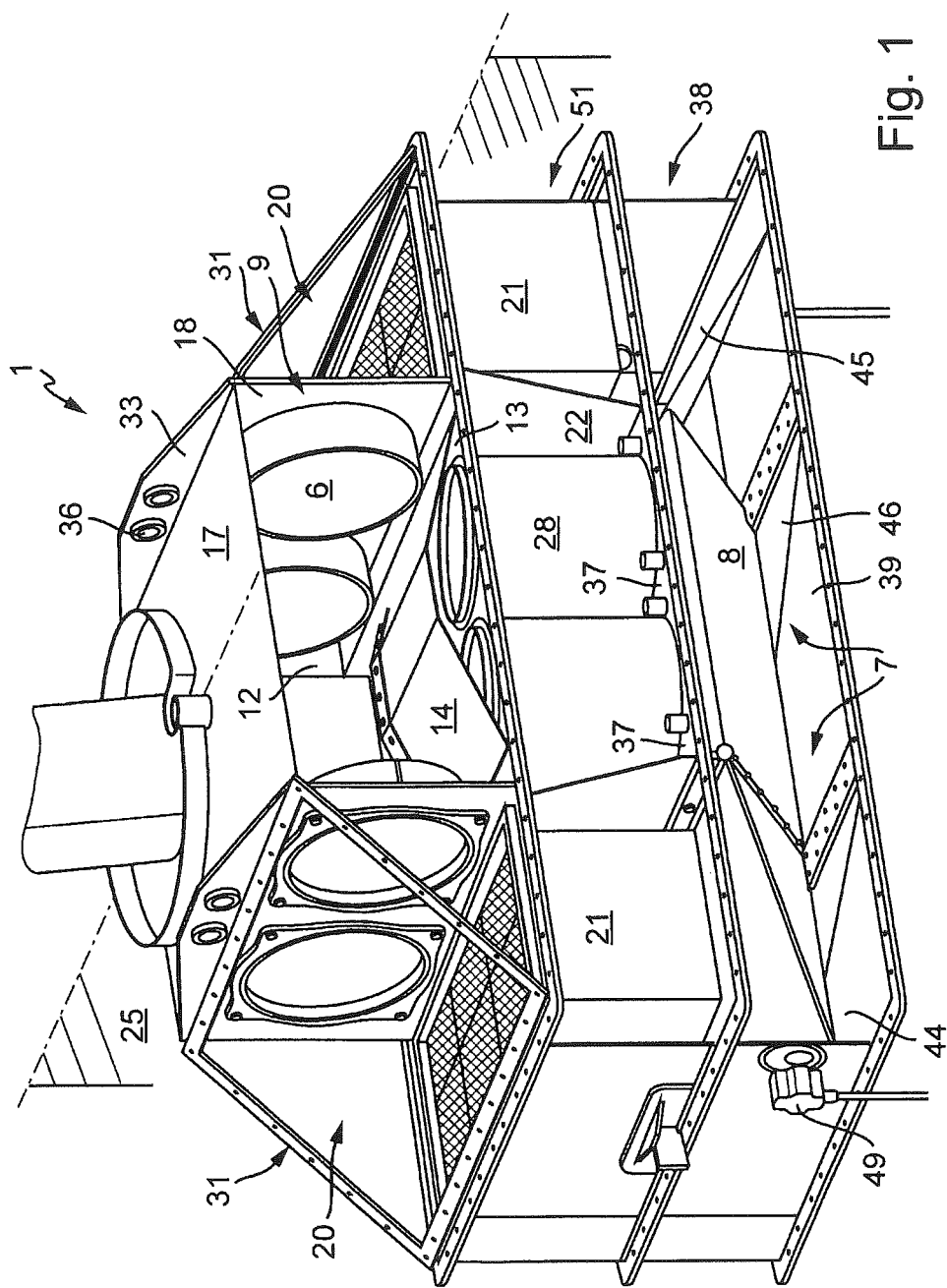
FIG. 1 a schematic, perspective illustration of an exhaust post-treatment device according to the disclosure, partially shown without a housing, FIG. 2 the inner support structure of an exhaust post-treatment device in its principle design equivalent to FIG. 1, FIG. 3 the inner support structure according to FIG. 2 with components allocated to an exhaust post-treatment arrangement of an exhaust post-treatment device according to FIG. 1, in a perspective illustration diagonally from the top, FIG. 4 an illustration according to FIG. 3 in a perspective diagonally from the bottom, FIG. 5 a schematic illustration of an exhaust cleaning arrangement, with the cross-section indicated in reference to FIG. 3 and FIG. 6, with a transition chamber being allocated thereto, FIG. 6 without the base plate of the housing shown, a bottom view according to the arrow VI in FIG. 5 of an exhaust post-treatment device according to the disclosure, based on the schematic illustration according to FIG. 5, with flow paths of the exhaust being indicated, FIG. 7 a cross-section according to the line VII-VII in FIG. 6 extending in the central level according to FIG. 1, FIG. 8 an isolated illustration of a housing, which shall perhaps be inserted as a one-piece component for an exhaust post-treatment device according to FIG. 1, and FIG. 9 a schematic illustration of a design as a foundation for a housing to be folded according to FIG. 8.
Figure 8:
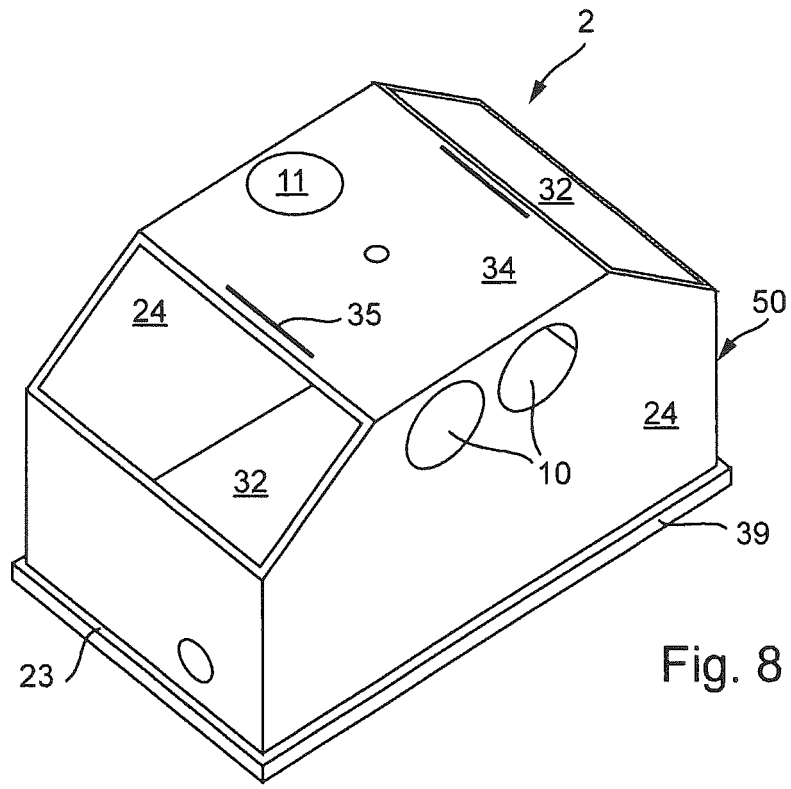

FIG. 1 shows a largely simplified perspective illustration of the basic design of an exhaust post-treatment device 1 according to the disclosure, with the display of the housing 2 encasing it being largely waived and such a housing 2 being displayed in the illustration according to FIG. 8, for example.

Figure 2:
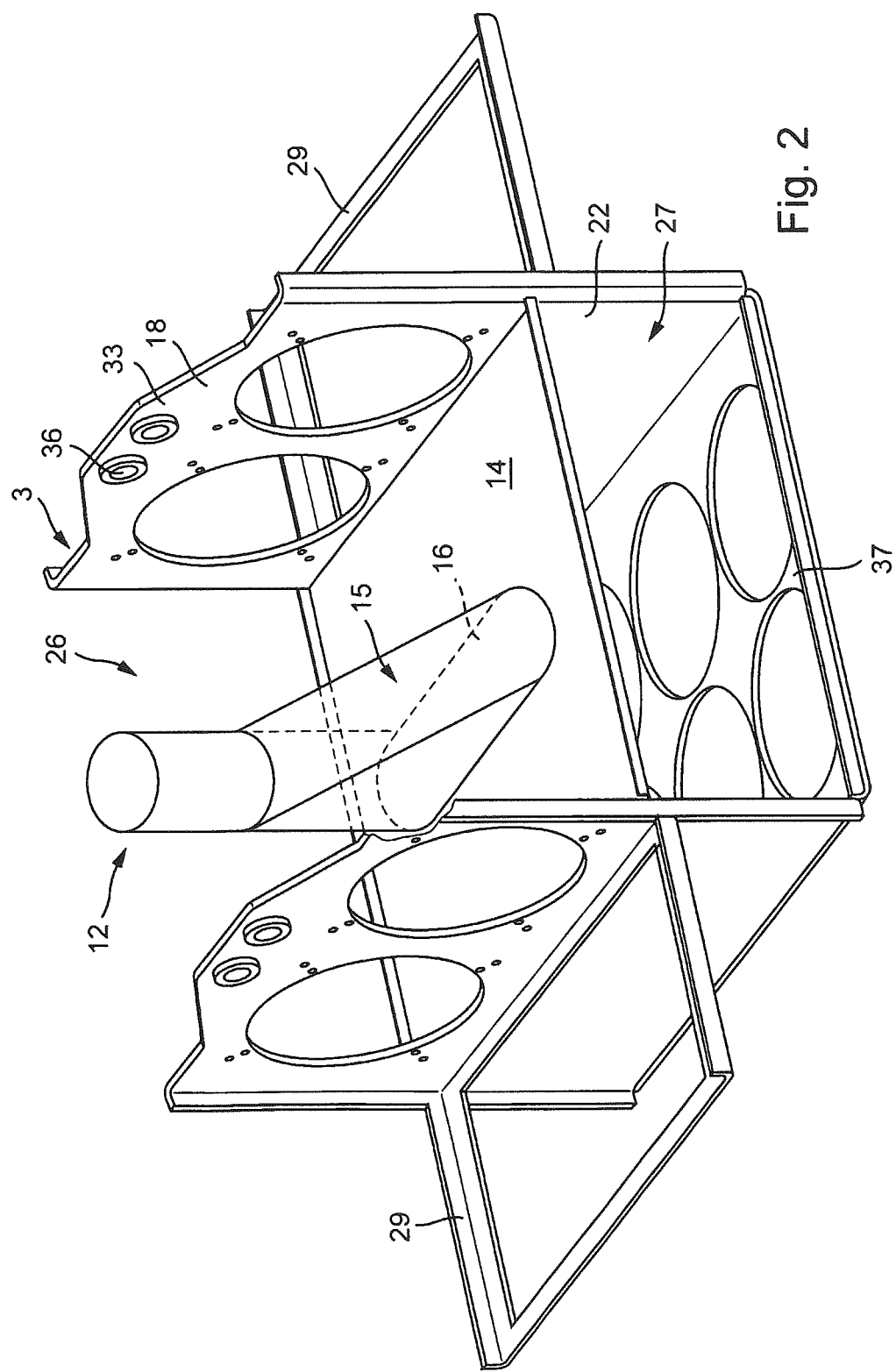
Figure 3:
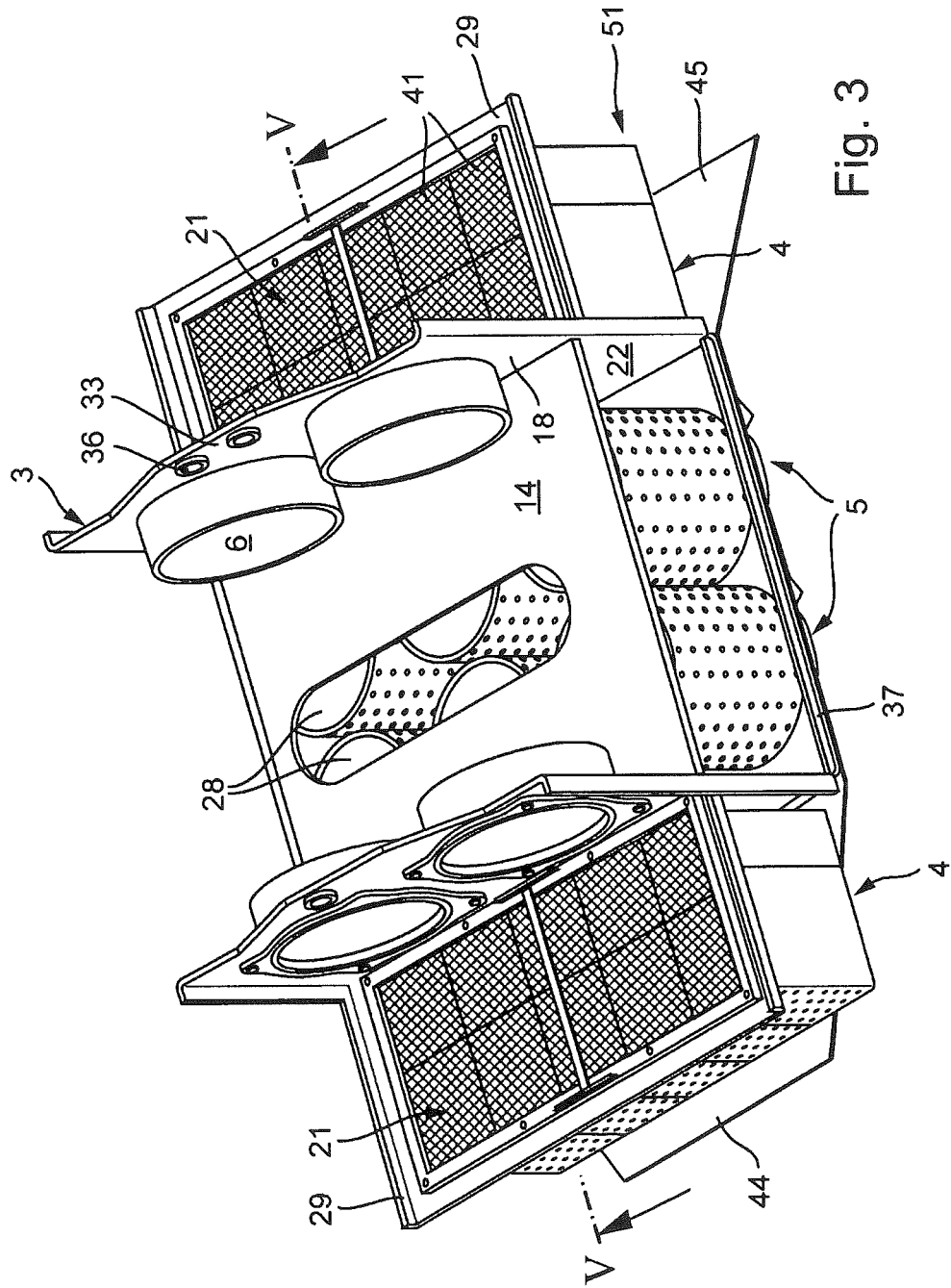
Figure 4:
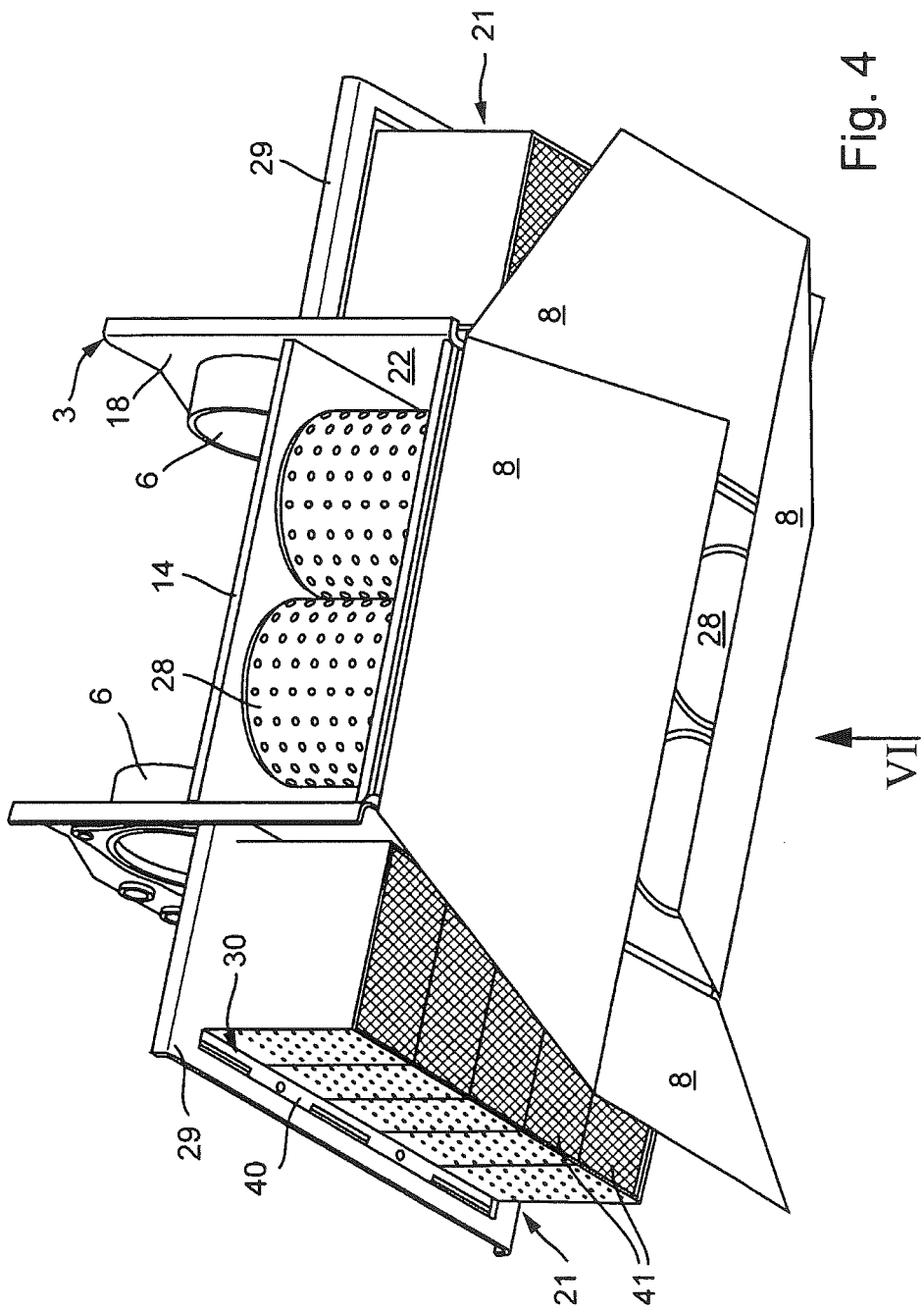

Adjusted to the basic design of the housing 2, with the basic design of the housing 2 being at least partially decisive, the exhaust post-treatment device 1 shows an interior structure 3 according to FIG. 2, which as a support structure, as particularly discernible from FIG. 3, accepts a soot filter unit 4, a denitrification-catalytic converter unit 5, as well as oxi-catalytic converters 6. Preferably, guide panels 8 are also provided at the interior structure 3 to form guide channels 7, as particularly discernible from FIGS. 5 to 7. Further, the interior structure 3 partially also comprises separating walls, boundary walls, and the like.

Figure 9:
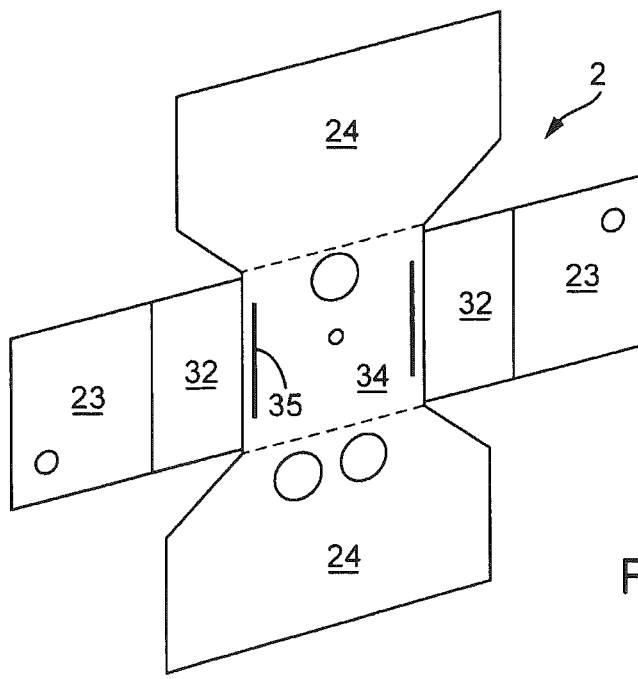

In an axial covering for the denitrification-catalytic converter unit 5, a supply chamber 9 is provided with upstream supply connections 10, indicated at the housing side in FIGS. 8 and 9, and downstream supply connections 11. The upstream supply connections 10, preferably allocated to one of the lateral walls 24 of the housing 2, are connected to an upstream spatial section 12 of the supply chamber 9, while a downstream supply connection 11 is connected to a downstream spatial section 13 of the supply chamber 9. The downstream spatial section 13 is located adjacent and covering the denitrification-catalytic converter unit 5 and is limited via a separating wall 14 from the upstream spatial section 12. As particularly discernible from FIGS. 1 and 2, the spatial section 12 is connected to the downstream supply connection 11. This is shown particularly in FIG. 2 as a chimney-like connection 15, which is mounted at an outlet opening 16 provided in the separating wall 14, as particularly discernible from FIG. 7.

The cover wall 17 is provided as the upper boundary of the supply chamber 9, which together with the separating wall 14 and lateral boundary walls 18 encase the upstream chamber section 12. The oxi-catalytic converters 6 are supported via the lateral boundary walls 18 and penetrate them in the transition to the overflow chambers 20, which are located in the transition connection from the upstream chamber portion 12 to the soot filters 21 of the soot filter unit 4. The accepting chambers for the soot filters 21 are limited from the denitrification-catalytic converter unit 5 located in the same level between the soot filters 21 via boundary walls 22, which laterally separate the accepting chamber for the denitrification-catalytic converter unit 5. Within the scope of exhaust post-treatment device 1 according to the disclosure, an exhaust cleaning arrangement 51 is formed at least from the denitrification-catalytic converter unit 5 and the soot filter unit 4.

Figure 6:
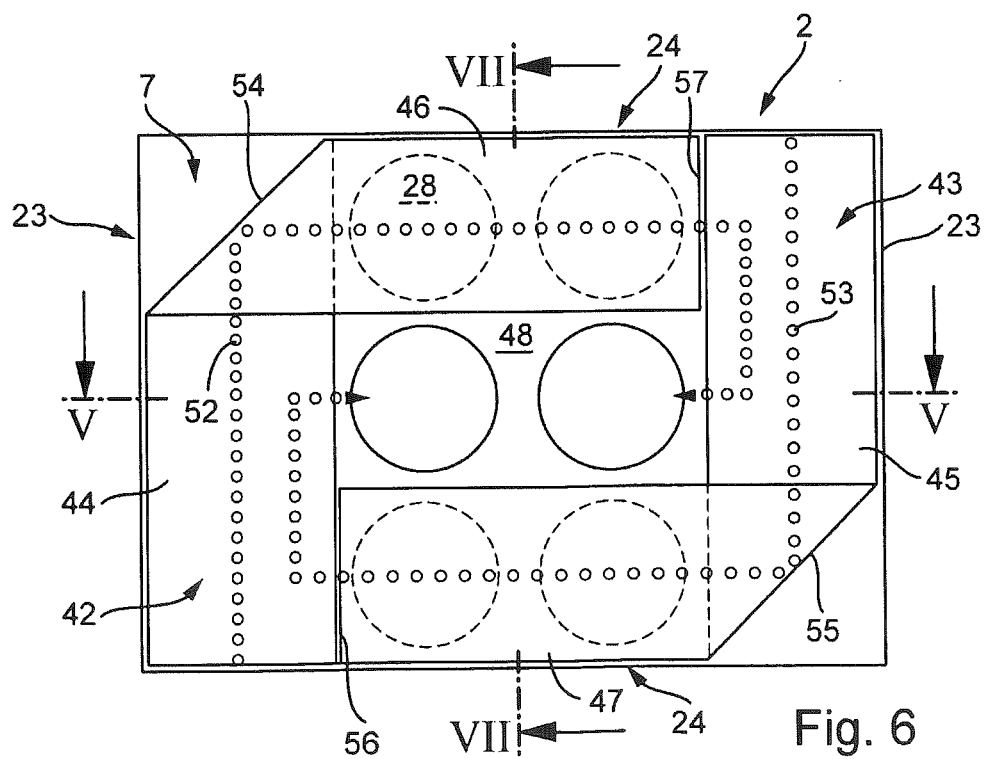

According to the basic design of the housing 2, it comprises side walls 23 and lateral walls 24, as discernible from FIG. 6, which in the cuboid form of the plan of the exhaust post-treatment device 1 shown are arranged perpendicular in reference to each other. In reference to the above-described embodiment of the exhaust post-treatment device 1, they are embodied symmetrical in reference to a central level 25 indicated in FIG. 1, extending parallel to the boundary walls 18 and the boundary walls 22, generally in the same level.

The interior structure 3 shows projecting support frames 29, extending laterally in the direction to the side walls 23 from its central area 26, accepting the supply chamber 9 and the accepting chamber 27 for the catalytic converter units 28 of the denitrification-catalytic converter unit 5, and extending approximately in the height of the transition from the accepting chamber 27 to the supply chamber 9. The support frames 29 serve to accept, in one exemplary arrangement, cuboid soot filter elements 41, each being combined via a frame 30 to soot filters 21 and supported. The frame 30 is supported via a support edge 40 at the support frame 29, so that the soot filters 21 are inserted in the support frame 29 and can also be fixed in this position.

A support frame 31 extends covering the support frame 29 and laterally contacting the boundary walls 18, respectively inclined like a roof, with its frame section corresponding to the window cut-outs 32 in the housing 2 (FIGS. 8 and 9), which are to be closed via lids, not shown, inclined in the closed state like a pitched roof, and allowing access to the soot filters 21 in order to allow assembling them in a simple fashion when necessary, removing, inserting and/or exchanging them.

For example, FIGS. 1 to 3 further illustrate that the interior structure 3 with regards to its boundary walls 18 shows a section 33 respectively projecting upwards beyond the cover wall 17 (FIG. 1) with penetrating slots 35 in the cover wall 34 of the housing 2, located covering the cover wall 17, being allocated thereto such that when the housing 2 is placed upon the interior structure 3 and connected thereto support eyelets 36 located in the sections 33 are located in the free access areas and perhaps, for example for the assembly of the exhaust post-treatment device 1, can be engaged by a support device.

The illustrations according to FIG. 1 through 3 further assume that the denitrification-catalytic converter unit 5 is composed from a plurality of cylindrical catalytic converters 28 with a housing-covered catalytic converter, as generally known with regards to design and function, and used for so-called SCR-catalytic converters.

The cylindrical catalytic converters 28 are supported and held via a support grid 37, not shown in greater detail, and supported at the boundary walls 22.

Thus, in the exhaust post-treatment device 1 according to the disclosure, a quasi multi-level design is given, with the supply chamber 9 being located in its upper level, its central level being filled by the soot filter unit 4 and the denitrification-catalytic converter unit 5, and with its basement being used and embodied as a transition chamber 38, with this transition chamber 38 being closed by a base plate 39 comprising one or more parts, which may be connected preferably in reference to the side and lateral walls 23, 24 of the housing 3 contacting the housing 3 and/or also connected to the interior structure 3 in a detachable fashion, the latter not shown.

In the transition chamber 38, the guide channels 7 are embodied with the use of guide panels 8, which starting from the edge areas of the support grid 37 partially extend diagonally downward and inwards, thus into an area separated from the edge area of the base plate 39, partially inclined oppositely diagonally towards the outside, under the soot filters 21, so that via the guide panels 8, the area of the soot filters 21 and/or the base plate 39 are covered thereby, and the respective side wall 23 and/or lateral wall 24 of the housing 3 for a generally triangular channel cross-section.

A first guide channel 42 and a second guide channel 43 are provided as guide channels 7, extending in the edge area in reference to the housing 2, each comprising channel legs 44 and/or 45 extending along the side walls 23 and channel legs 46, 47 extending along the opposite lateral walls 24. The channel legs 44, 46 of the first guide channel 42 and 45, 47 of the second guide channel 43 each extend according to the perimeter of the housing 2, particularly perpendicular in reference to each other. Here, the channel legs 44, 45 extend along the side walls 23 each over the length of the side walls and transfer into the channel legs 46, 47 which extend along the lateral walls 24. From the channel legs 44, 46 of the first guide channel 42 the channel leg 46 extends along the lateral wall 24 to the channel leg 45 of the second guide channel 43 extending along the side wall 23, and a corresponding situation is given with regards to the second guide channel 43, with its channel leg 47 extending along the lateral wall 24 tapering towards the channel leg 44 of the first guide channel 42 extending along the side wall 23.

The exhaust portion flowing through the first guide channel 42 therefore impacts the guide panel 8 of the back of the channel leg 45 of the second guide channel 43 facing away from the side wall 23 and accordingly flows deflected to a mixing chamber 48, which is encased by the guide channels 7 inside the transition chamber 38, formed by the first guide channel 42 and the second guide channel 43. The progression of flow of the exhaust inside the transition chamber 38 is illustrated in FIG. 6 for the first guide channel 42 and the second guide channel 43 each by markings 52, 53, with FIG. 6 also disclosing that the respective channel legs 44, 46 and 45, 47 of the first guide channel 42 and the second guide channel 43 perhaps show guide panels 8, following each other in one piece or angular by a fold.

Accordingly, the sections of the guide panels 8 allocated to the channel legs 44, 45 of the guide channels 42, 43, which extend from the support grid 39 diagonally downwards and towards the outside against the respective side wall 23, are impacted at both sides and the guide panels 8 form separating walls according to the invention in these sections impacted at both sides between the partial exhaust flows illustrated by the markings 52, 53 in the progression of flow.

Figure 5:
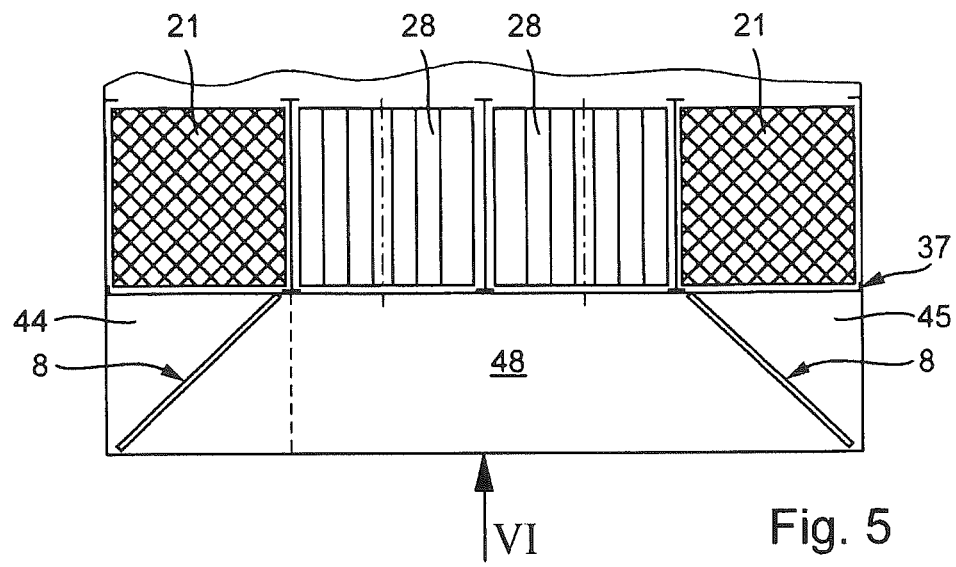
Figure 7:
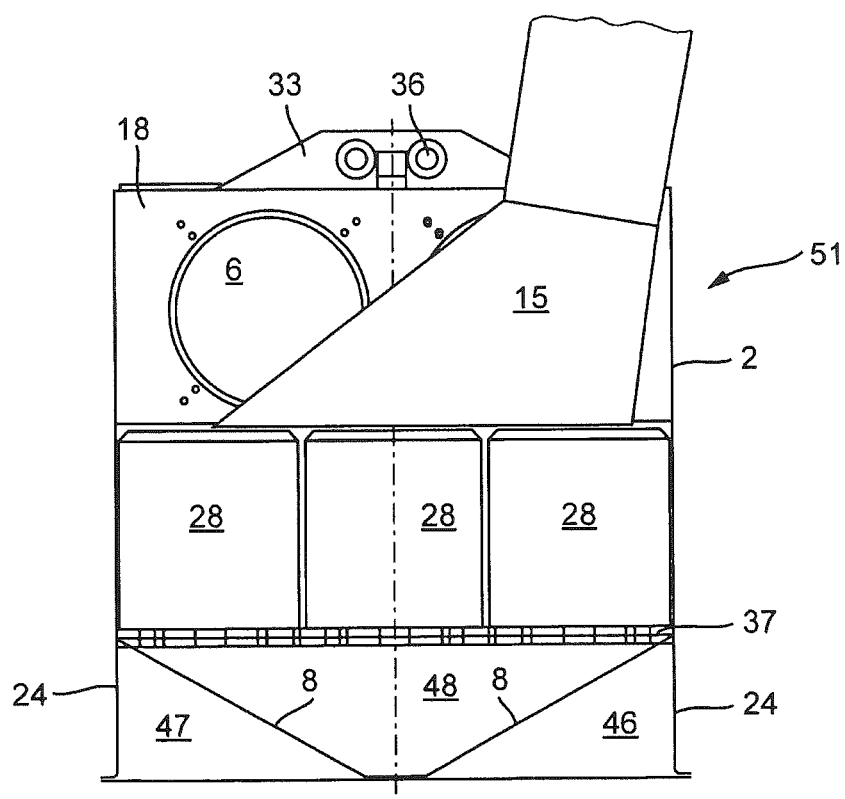

In connection with FIG. 6 this design is particularly illustrated in FIGS. 5 and 7, with FIG. 7 showing that the guide panels 8 of the channel legs 46, 47 extend diagonally downwards and inwards along the lateral walls 24, starting from the lateral walls 24 in the area of the edges of the support grid 37 adjacent thereto, thus inclined opposite in reference to the sections of the guide panels 8, which extend from the support grid 37 underneath the soot filters 21 diagonally downwards and outwards against the respective side wall 23, accordingly off-set inwardly in reference to the side wall 23 at the support grid 37.

According to the opposite incline, an intersecting line develops between the mutually angled sections of a guide panel 8, as illustrated in FIG. 6 for the guide channels 42 and 43 at 54 and 55. This way a free corner section develops as a penetrating area in the transition between the respective channel legs 44, 46 and 45, 47, with the exhaust coming from the respective soot filter 21 impacting the guide panel 8 of the respective channel leg 44, 45 from the top and flowing along thereof via the free corner section as a passage underneath the guide panel 8 on the channel leg 46 and/or 47. This section of the respective guide panel 8 tapers in an edge 56 and/or 57, which is distanced from the guide panel 8 of the respective channel leg 44, 45, declined towards the outside. This way an angled detail develops between the section of the guide panel 8 of the channel leg 46, 47 tapering to the edge 56 and/or 57 and a section of the guide panel 8 of the channel leg 44, 45 by which the exhaust flow enters the mixing chamber 48 as illustrated by the respective marking 52, 53. The mixing chamber 48 represents a trough-like recess according to the disclosure, with its trough walls respectively formed by the guide panels, located opposite each other and mutually inclined; here the trough walls following the side walls 23 are tilted declining towards the edge of the base plate 39 and the trough walls following the lateral walls 24 are tilted inclined starting at the edge of the bottom plate 39.

Accordingly, as discussed above, the section of the guide panels 8 allocated to the respective channel leg 44, 45 is impacted on the one side by a partial exhaust flow inflowing via the soot filter 21 and on the other side by a partial exhaust flow inflowing via the mixing chamber 48. At its free faces, the sections of the guide panels 8 allocated to the channel legs 44 to 47 each preferably taper in the direction of extension of the respective channel leg 44 to 47 as well as the edges 56 and 57.

The embodiment according to the disclosure of the exhaust guide between the soot filters 21 and the catalytic converters 28 of the denitrification-catalytic converter unit 5 therefore occurs repeatedly deflected to the mixing chamber 48, with by the arrangement of the guide panels 8 according to the disclosure, a great volume is created for the mixing chamber with a simultaneous use of the guide panels 8 to form the exhaust guide channels 42, 43.

According to the symmetric design of the exhaust post-treatment device 1, a generally even distribution of the exhaust develops inflowing to the upstream spatial section 12 of the supply chamber 9 to the soot filters 21 located at both sides of the supply chamber 9 and accordingly also to the first and the second guide channel 42, 43, resulting in a homogenous mixing of the exhaust both based on the long guide path inside the first and the second guide channel 42, 43 as well as due to the opposite influx of the exhaust in the mixing chamber 48, which leads for the following catalytic converters 28 of the denitrification-catalytic converter unit 5 to be flown through in a largely homogenous impacting with regards to both the amount as well as the quality of the exhaust.

The described operation of the exhaust post-treatment device 1 proves to be beneficial, particularly in connection with the embodiment of the denitrification-catalytic converter unit 5 as a unit operating with adjuvants, particularly reduction means, with according to the disclosure, particularly the use of urea solution being provided as the reduction means, such as known from SCR-catalytic converters. The respective injection of the urea solution occurs with or without any support of pressurized air in a preferred sprayed fashion, particularly without any support of pressurized air, with due to the design of the exhaust post-treatment device described long mixing paths can be achieved with an overall compact design yielding a homogenous mixing of the urea, disintegrated to ammonia, with the exhaust.

The injection of the urea is schematically indicated in FIG. 1 and occurs via injectors 49, according to the design of the exhaust post-treatment device 1 in the channel legs 44, 45 of the first and the second guide channel 42 and 43 parallel in reference to the side walls 23.

FIGS. 8 and 9 illustrate a generally one-part design of the housing 2 comprising a cap-shaped top 50, in which the respective connection openings are provided, and an indicated base plate 39. Such a cap-shaped top 50 may be embodied, particularly for smaller sized exhaust post-treatment devices 1 and also according to FIG. 9, as a folded part, which is simple, and particularly considered for larger exhaust post-treatment devices 1 to be produced as an easy welded construction.

It is not shown in the drawings that the catalytic converters 28 of the denitrification-catalytic converter unit 5, particularly at the discharge side on the downstream spatial section 13 of the supply chamber 9, comprise a slip catalytic converter in a structural unit, particularly in order to avoid detrimental odors in connection with the use of urea solution and by its disintegration developing ammonia as the reduction means.

The structure of the exhaust post-treatment device 1 as layered levels discernible as an overview in FIG. 1 can advantageously be realized also with an appropriately segmented design of the housing 2; the respective housing parts can be connected to each other via flange connections, and the bottom of the trough-shaped embodiment and the top with a cup-shaped embodiment are connected with flanges to the central housing part only covering the central part in an annular fashion.

What is claimed is:

1. An exhaust post-treatment device, particularly for diesel engines, comprising: a housing comprising supply connections at a housing side, an exhaust cleaning arrangement accepted by the housing and located in a connection between the supply connections, wherein the exhaust cleaning arrangement comprises a soot filter unit and a denitrification-catalytic converter unit arranged adjacent thereto, which are axially flown through oppositely and are connected to each other via a transition chamber, located side-by-side and perpendicular in reference to a direction of flow, wherein the transition chamber in reference to the exhaust cleaning arrangement is axially opposite to the supply connections, and wherein the soot filter unit is divided into two longitudinally opposite soot filters arranged at lateral housing walls and that the denitrification-catalytic converter unit is arranged lying between the soot filters of the soot filter unit.

2. An exhaust post-treatment device according to claim 1, wherein the transition chamber comprises an arrangement of guide panels in a planar covering of the exhaust cleaning arrangement, via which exhaust that is respectively discharged via the soot filters is introduced in a direction opposite to the flow direction of and into a mixing chamber forming a section of the transition chamber covering the denitrification-catalytic converter unit.

3. An exhaust post-treatment device according to claim 2, wherein the guide panels, each starting at a soot filter, are a part of a boundary of a guide channel, which is limited towards a side wall extending along the soot filter and a lateral wall of the housing following thereto, in which each of the guide channels abuts another lateral wall of the housing opposite each other.

4. An exhaust post-treatment device according to claim 3, wherein the sections of the guide channels extending along the lateral walls each mouth at the guide panel of the other guide channels extending along the side walls such that the guide panel extends between the sections of both guide channels in a separating fashion.

5. An exhaust post-treatment device according to claim 2, wherein the guide panel of the guide channels, each starting at the edge of the mixing chamber, allocated to the exhaust cleaning arrangement extend tilted against side and lateral walls of the housing and directly abut in an area of the transition chamber at the bottom, distanced from the exhaust cleaning arrangement.

6. An exhaust post-treatment device according to one of claim 2, wherein guide channels of the mixing chamber located covering the denitrification-catalytic converter unit are separated by the guide panels, such that the mixing chamber tapers along side walls in a direction towards the denitrification-catalytic converter unit, expands along the lateral walls in the direction towards the denitrification-catalytic converter unit, and is formed with regards to its wall diagonals by guide panels of the guide channels.

7. An exhaust post-treatment device according to claim 1, wherein the denitrification-catalytic converter unit is covered by a supply chamber with upstream and downstream supply connections, which is divided into an upstream spatial section and a downstream spatial section adjacent to the denitrification-catalytic converter unit.

8. An exhaust post-treatment device according to claim 7, wherein the supply chamber comprises a transitional connection including at least one oxi-catalytic converter in the transition to the soot filters of the exhaust cleaning arrangement located lateral in reference to the exhaust catalytic converter unit.

9. An exhaust post-treatment device, particularly according to claim 1, wherein the exhaust post-treatment device is embodied as a composed unit with an internal structure inserted into a surrounding housing, which accepts soot filters and/or denitrification-catalytic converters as insert elements.

10. An exhaust post-treatment device according to claim 9, wherein the housing is embodied as a cap-shaped composed or folded module, that can be placed upon the internal structure, particularly as a one-piece module.

* * * * *